United States Patent
Mathon et al.

(10) Patent No.: US 9,333,729 B2
(45) Date of Patent: May 10, 2016

(54) COMPACTING DEVICE FOR A MACHINE FOR WINDING A FIBROUS TEXTURE ONTO AN IMPREGNATION MANDREL

(75) Inventors: Richard Mathon, New Castle, NH (US); Antoine Phelippeau, Portsmouth, NH (US); Micah Gummel, East Kingston, NH (US); Jean-François Durand, Baraqueville (FR)

(73) Assignee: SNECMA, Paris (FR)

( * ) Notice: Subject to any disclaimer, the term of this patent is extended or adjusted under 35 U.S.C. 154(b) by 169 days.

(21) Appl. No.: 14/111,191

(22) PCT Filed: Apr. 10, 2012

(86) PCT No.: PCT/FR2012/050778
§ 371 (c)(1),
(2), (4) Date: Jan. 3, 2014

(87) PCT Pub. No.: WO2012/140357
PCT Pub. Date: Oct. 18, 2012

(65) Prior Publication Data
US 2014/0110063 A1    Apr. 24, 2014

(30) Foreign Application Priority Data

Apr. 13, 2011    (FR) .................................. 11 53213

(51) Int. Cl.
| | | |
|---|---|---|
| B29C 53/00 | (2006.01) | |
| B32B 37/00 | (2006.01) | |
| B29C 70/32 | (2006.01) | |
| B29C 53/56 | (2006.01) | |
| B29C 53/80 | (2006.01) | |
| B29L 31/00 | (2006.01) | |

(52) U.S. Cl.
CPC ........... *B32B 37/0046* (2013.01); *B29C 53/562* (2013.01); *B29C 53/566* (2013.01); *B29C 70/32* (2013.01); *B29C 53/8075* (2013.01); *B29C53/8083* (2013.01); *B29C 2053/8025* (2013.01); *B29L 2031/7504* (2013.01)

(58) Field of Classification Search
CPC ..................... B29C 2053/8025; B29C 53/562; B29C 53/566; B29C 53/8075; B29C 53/8083; B29C 70/32; B29L 2031/7504; B32B 37/0046; B65H 18/103; B65H 23/0328; B65H 2557/51; B65H 2701/177
USPC .................... 156/64, 171, 361, 367, 368, 433
See application file for complete search history.

(56) References Cited

U.S. PATENT DOCUMENTS

| | | | |
|---|---|---|---|
| 2007/0272346 A1 | 11/2007 | Shpik et al. | |
| 2008/0093026 A1 | 4/2008 | Naumann | |
| 2010/0024971 A1 | 2/2010 | Benson et al. | |
| 2010/0300600 A1* | 12/2010 | Bichsel | ........................ 156/64 |

FOREIGN PATENT DOCUMENTS

| | | |
|---|---|---|
| FR | 2 656 826 | 7/1991 |
| JP | 2003-211447 | 7/2003 |
| WO | 2009 097514 | 8/2009 |

OTHER PUBLICATIONS

Translation of FR 2656826, published Jul. 12, 1991, France.*
International Search Report Issued Jul. 11, 2012 in PCT/FR12/050778 Filed Apr. 10, 2012.

* cited by examiner

*Primary Examiner* — George Koch
(74) *Attorney, Agent, or Firm* — Oblon, McClelland, Maier & Neustadt, L.L.P.

(57) ABSTRACT

A compacting device for a machine for winding a fiber texture on an impregnation mandrel, the device including a frame including mounted thereon a compacting roller for bearing against an outside surface of an impregnation mandrel of a winding machine, and two compacting wheels, each configured to bear against a corner formed between the outside surface and a side plate of the impregnation mandrel.

11 Claims, 8 Drawing Sheets

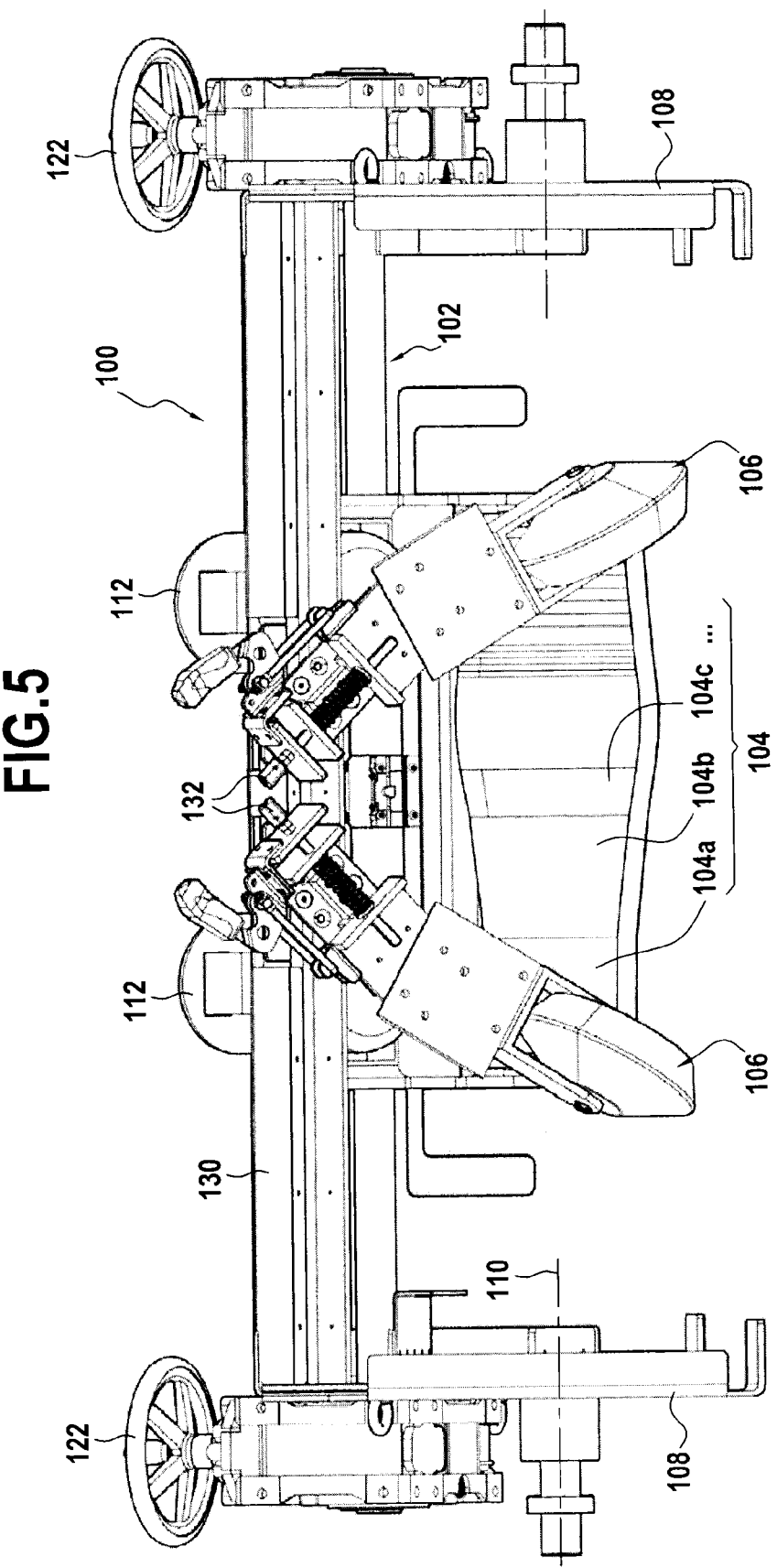

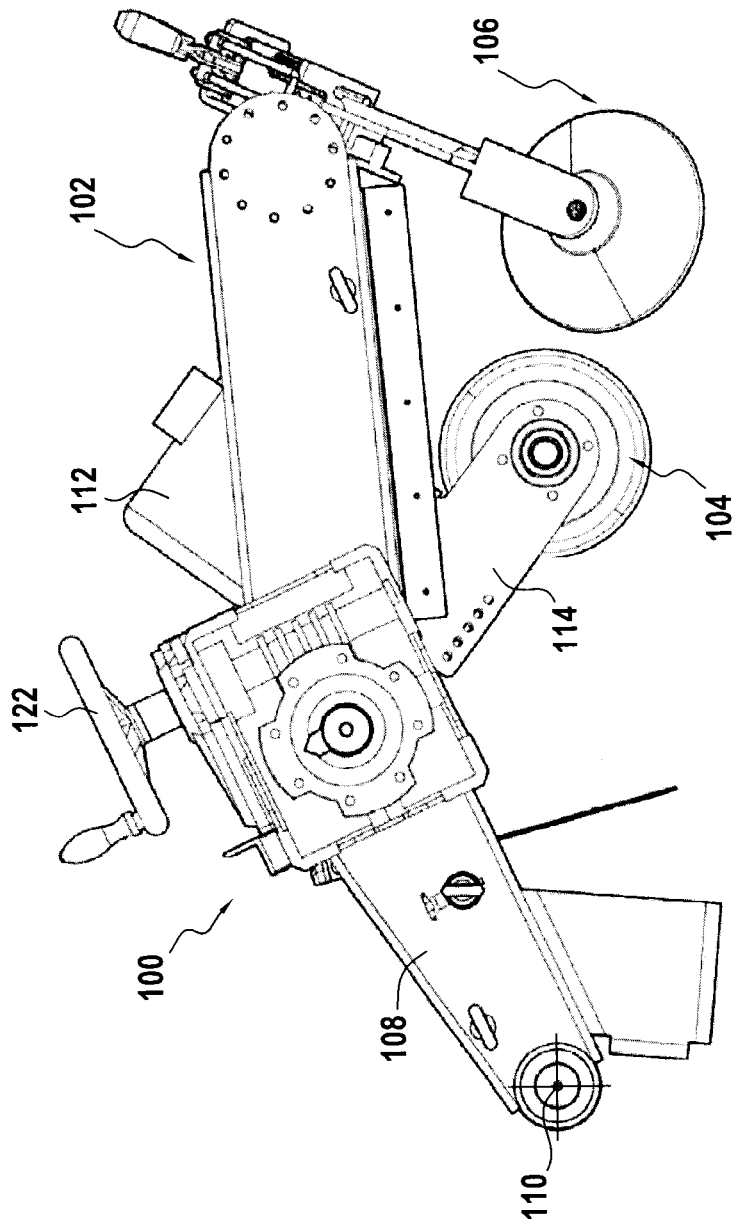

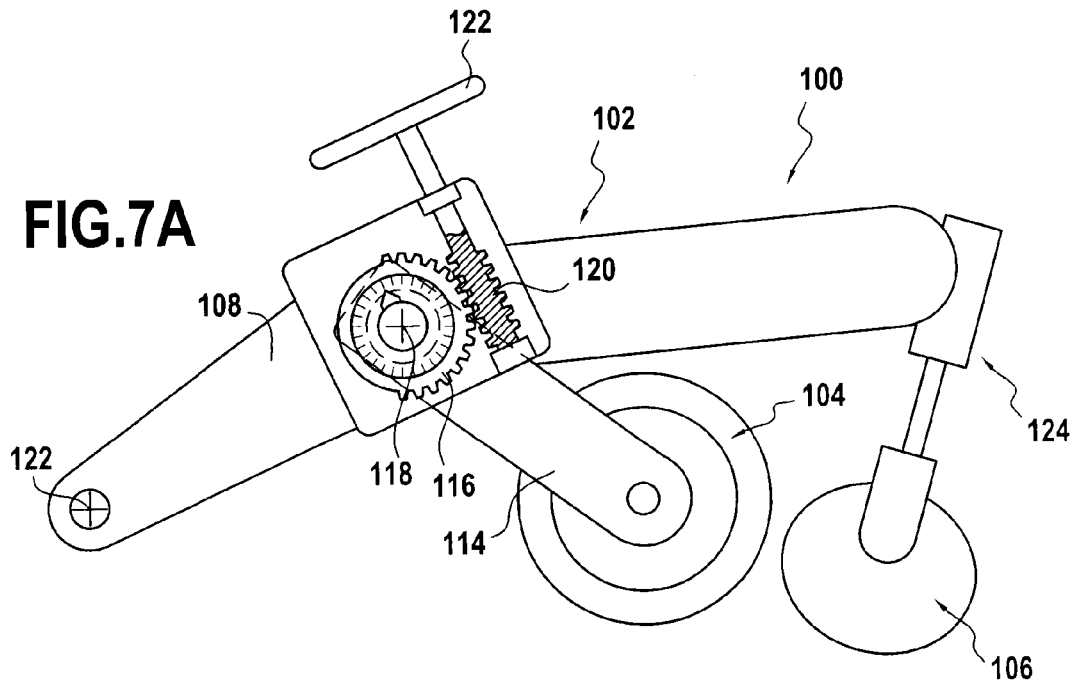
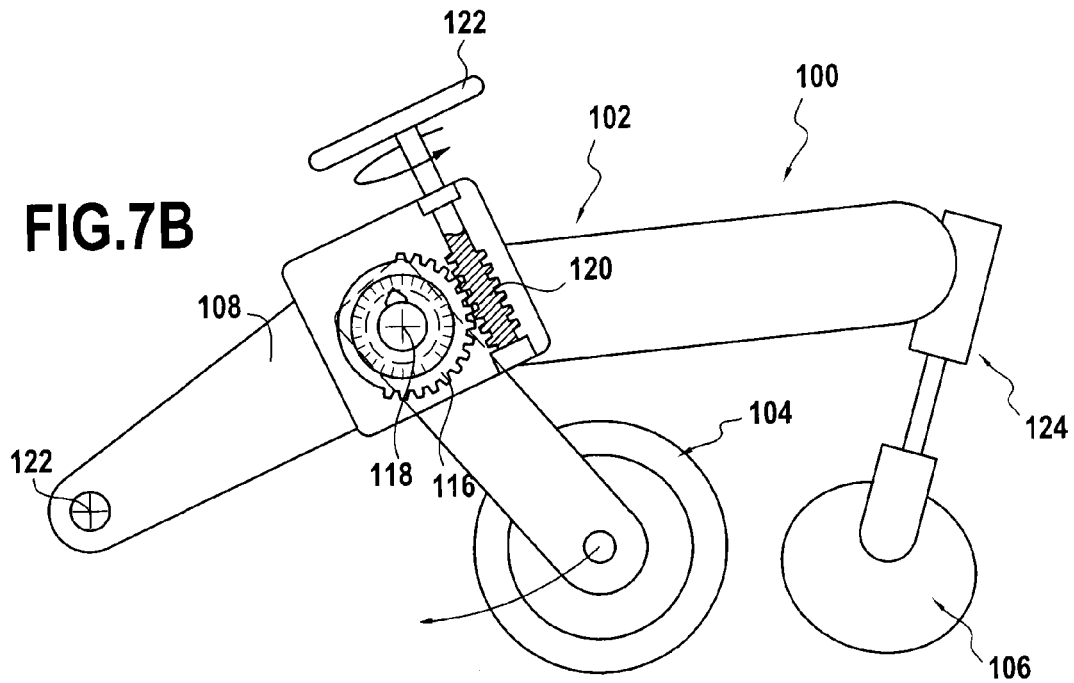

COMPACTING DEVICE FOR A MACHINE FOR WINDING A FIBROUS TEXTURE ONTO AN IMPREGNATION MANDREL

This application is a national stage entry of PCT/FR12/50778, filed Apr. 10, 2012.

BACKGROUND OF THE INVENTION

The present invention relates to the general field of making gas turbine casings out of composite material, and it relates more particularly to gas turbine fan retention casings for aeroengines.

In a gas turbine aeroengine, a fan casing performs several functions: it defines the air inlet passage into the engine, it supports an abradable material facing the tips of the fan blades, it supports an optional structure for absorbing sound waves for acoustic treatment at the inlet of the engine, and it incorporates or supports a retention shield. The shield constitutes a trap for retaining debris, such as ingested articles or fragments of damaged blades that are thrown outwards by centrifuging, in order to prevent them from passing through the casing and reaching other portions of the aircraft.

A fan retention casing is commonly constituted by a relatively thin wall defining the air inlet passage and supporting an abradable material overlying the path followed by the tips of the fan blades, together with the acoustic treatment coating, if any, and also by a shield structure that is fastened to the outside of this wall, level with the fan.

Proposals have already been made to make a fan retention casing out of composite material. By way of example, reference may be made to document EP 1 961 923, which describes fabricating a composite material casing of thickness that varies and that includes forming fiber reinforcement in the form of superposed layers of a fiber texture and densifying the fiber reinforcement with a matrix. More precisely, that document makes provision for using a takeup mandrel for three-dimensional weaving of the fiber texture, which texture is then wound as superposed layers onto an impregnation mandrel that presents an outside surface having a profile corresponding to the profile of the central portion of the casing that is to be made, together with two side plates that correspond to the flanges for fastening the casing. The fiber preform as obtained in that way is held on the impregnation mandrel and it is impregnated with resin prior to the resin being polymerized.

Practical implementation of that method raises the problem of transferring the fiber texture from the takeup mandrel onto the impregnation mandrel. While that winding is taking place, it is necessary in particular to ensure an adequate level of compacting on the superposed layers of fiber texture on the impregnation mandrel. The amount of compacting to which the fiber texture layers are subjected while they are being wound has a direct influence on the fiber density of the resulting preform. In particular, it must be possible to compact the layers of fiber texture both for the outside surface of the impregnation mandrel and in the corners formed between said surface and the side plates of the mandrel.

Consequently, there exists the need for a tool that enables the various layers of fiber texture to be compacted in effective and appropriate manner while they are being wound onto the impregnation mandrel.

OBJECT AND SUMMARY OF THE INVENTION

A main object of the present invention is thus to mitigate such a need by proposing a compacting device for a machine for winding a fiber texture on an impregnation mandrel, the device comprising, in accordance with the invention, a frame having mounted thereon a compacting roller for bearing against the outside surface of an impregnation mandrel of a winding machine, and two compacting wheels each designed to bear against a corner formed between the outside surface and a side plate of the impregnation mandrel.

In operation, the compacting roller of the device of the invention exerts pressure on the layers of fiber texture superposed on the impregnation mandrel over the future central portion of the casing that is to be fabricated, with this pressure contributing to compacting these layers. Likewise, the layers of fiber texture over the corners formed between the central portion and that are to constitute the fastening flanges of the casing that is to be fabricated are compacted by the pressure exerted by the wheels of the compacting device.

Furthermore, the compacting device makes it possible to optimize the application of tension on the fiber texture while it is being wound onto the impregnation mandrel. The compacting effect thus enables the preform to be given its final compacting level and enables a winding tension (lying in the range 500 newtons (N) to 1500 N) to be applied so as to fix this level of compacting in the preform even when the preform is no longer under the compacting roller and wheels.

Preferably, the compacting device further comprises means for applying vibration to the compacting roller and wheels. Imparting vibration to the compacting roller and wheels gives rise to micropeening on the layers of fiber texture, thereby amplifying the compacting effect on the preform.

The means for applying vibration to the compacting roller and wheels may comprise at least one electric vibrator mounted on the frame.

Also preferably, the compacting device comprises means for adjusting the position of the compacting roller relative to the frame. This adjustment option makes it possible to adjust the position of the compacting roller accurately on the layers of fiber texture wound on the impregnation mandrel.

Under such circumstances, the compacting roller may be mounted to rotate between two plates that are secured to the frame, with each plate having one end that is constrained to pivot with a toothed wheel suitable for pivoting about a horizontal axis by meshing with a wormscrew.

Advantageously, the outside surface of the compacting roller presents a profile corresponding to the profile of the outside surface of the impregnation mandrel against which it is to bear.

The compacting roller may comprise a plurality of longitudinal roller sections that are mutually independent in rotation. Given the generally varying diameter of a retention casing, this feature of the compacting device makes it possible to accommodate differences in rotation between the various sections of the roller so as to ensure that all points of the mandrel are subjected to rolling without friction.

Also preferably, the compacting device further comprises means for adjusting the positions of compacting wheels relative to the frame. This adjustment option makes it possible to adjust the position of the compacting wheels accurately against the corners formed between the outside surface and the side plates of the impregnation mandrel.

Under such circumstances, each compacting wheel may be mounted on a wheel support having a first portion forming a clamp suitable for sliding on a stationary longitudinal rod of the frame so as to enable the compacting wheels to be adjusted in position relative to the frame in a longitudinal direction, and a second portion forming a slider mounted on the first portion and suitable for sliding relative thereto in a radial direction so as to enable the positions of the compacting wheels to be adjusted relative to the frame in said radial direction.

Preferably, the compacting roller and the compacting wheels are covered in a coating made of an elastomer material. Using an elastomer coating enables the compacting roller and wheels to adapt better to the outside profile of the impregnation mandrel in order to apply substantially uniform pressure against all points of the mandrel.

The invention also provides a machine for winding a fiber texture on an impregnation mandrel, the machine comprising a takeup mandrel on which a fiber texture obtained by three-dimensional weaving is to be stored, the takeup mandrel having an axis of rotation that is substantially horizontal, an impregnation mandrel onto which superposed layers of the fiber texture stored on the takeup mandrel are to be wound, the impregnation mandrel having an axis of rotation that is substantially horizontal and parallel to the axis of rotation of the takeup mandrel, electric motors for driving the mandrels in rotation about their respective axes of rotation, a control unit for controlling the electric motors for driving rotation of the mandrels, and a compacting device as defined above.

Preferably, a winding machine further comprises a support structure having the compacting device mounted thereon to pivot about a substantially horizontal axis, together with at least one actuator having its body fastened to the support structure and its rod fastened to the frame of the device so as to enable the compacting device to be pivoted about the horizontal axis.

BRIEF DESCRIPTION OF THE DRAWINGS

Other characteristics and advantages of the present invention appear from the following description made with reference to the accompanying drawings that show an embodiment having no limiting character. In the figures:

FIGS. 4 to 6 are a perspective view and side views of the compacting device of the invention fitted to the winding machine of FIG. 1;

FIGS. 7A and 7B are views of the compacting device of FIGS. 4 to 6 showing the adjustment of the position of the compacting roller.

DETAILED DESCRIPTION OF AN EMBODIMENT

The invention is described below in the context of its application to fabricating a fan casing for a gas turbine aeroengine.

An example of a method of fabricating such a fan casing is described in document EP 1 961 923, to which reference may be made.

The casing is made of composite material comprising fiber reinforcement densified with a matrix. The reinforcement is made of fibers, e.g. carbon, glass, aramid, or ceramic fibers, and the matrix is made of polymer, e.g. epoxy, bismaleimide, or polyimide.

Briefly, the fabrication method described in this document consists in making a fiber texture by three-dimensional weaving with warp takeup on a drum (referred to below as a "takeup mandrel") having a profile that is determined as a function of the profile of the casing to be fabricated. In particular, the fiber texture is made as a single piece with a central portion corresponding to the central portion of the casing that is to be fabricated and with two flanges corresponding to the fastener flanges of the casing.

The fiber structure as made in this way is then transferred onto the mandrel of a resin injection mold (referred to below as the "impregnation" mandrel) of outside profile that corresponds to the inside profile of the casing to be fabricated. With the preform held on the impregnation mandrel, impregnation is then performed using a resin. For this purpose, a covering is applied over the preform and the resin is injected into the mold as constituted in this way. Impregnation may be assisted by establishing a pressure difference between the inside and the outside of the mold in which the preform is located. After impregnation, a step is performed of polymerizing the resin.

Figure 1:
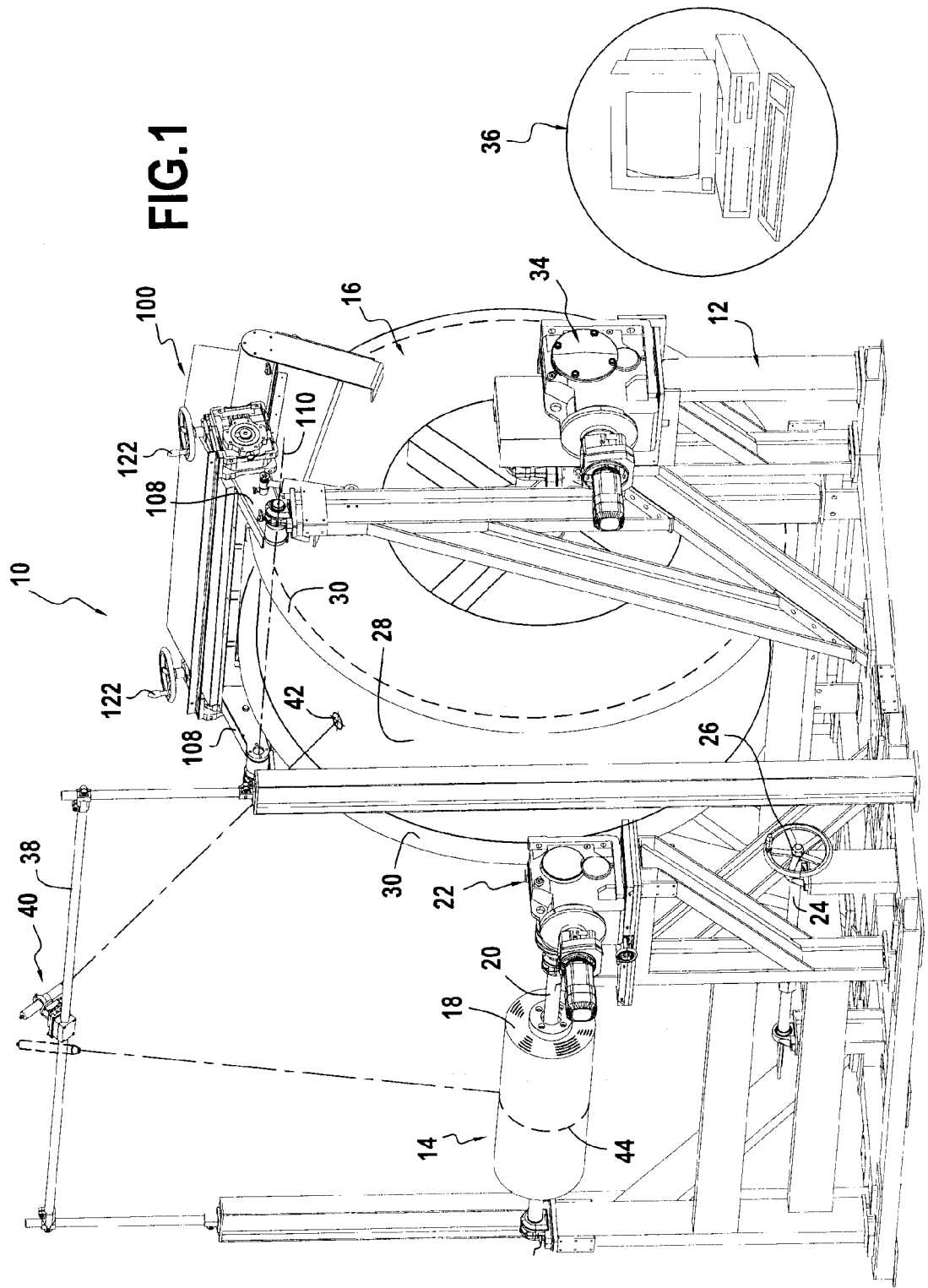
FIG. 1 is a perspective view of a machine for winding a fiber texture on an impregnation mandrel including a compacting device of the invention.
Figure 2:
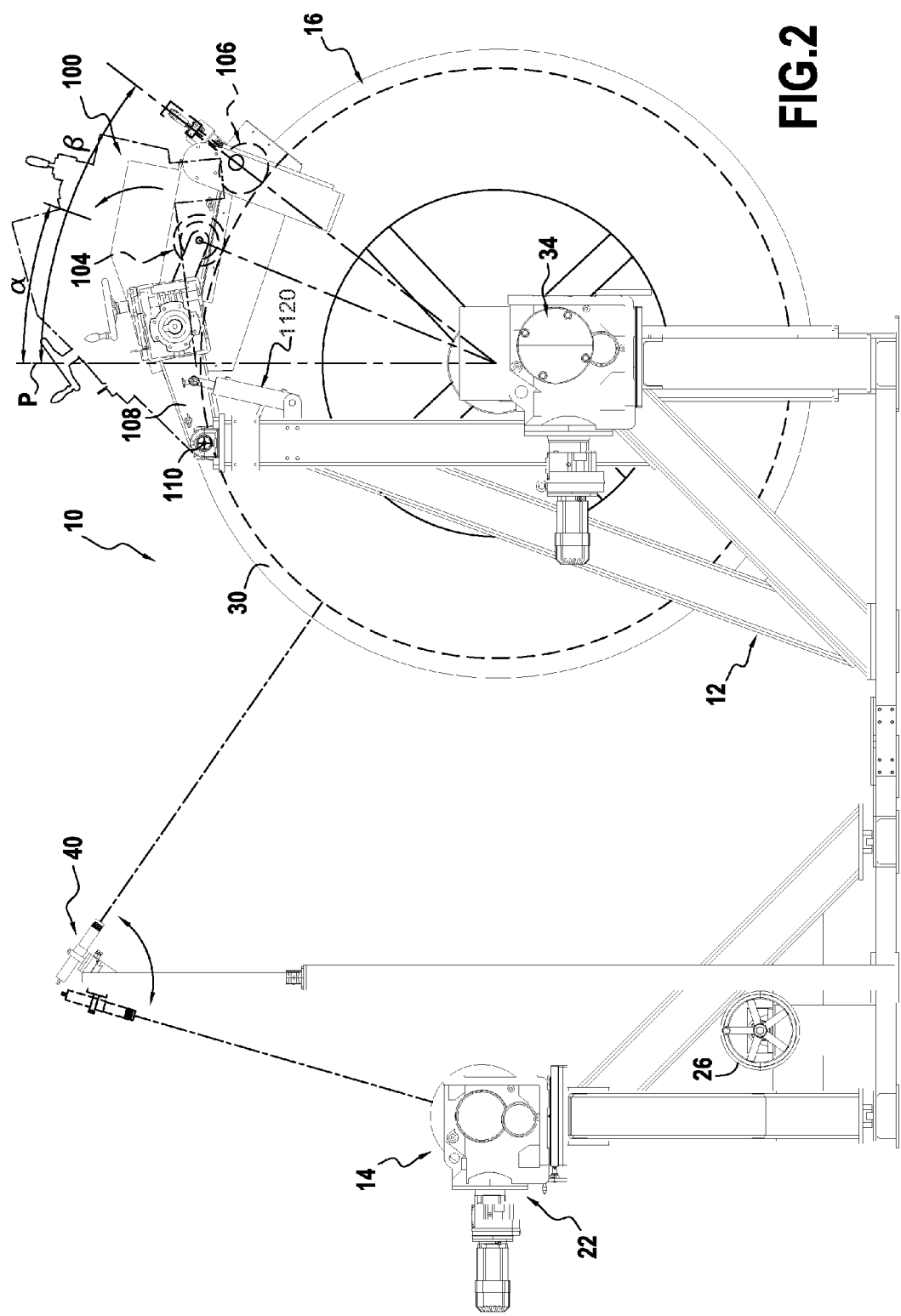
FIGS. 2 and 3 are views of the FIG. 1 winding machine, respectively from the side and from above.
Figure 3:
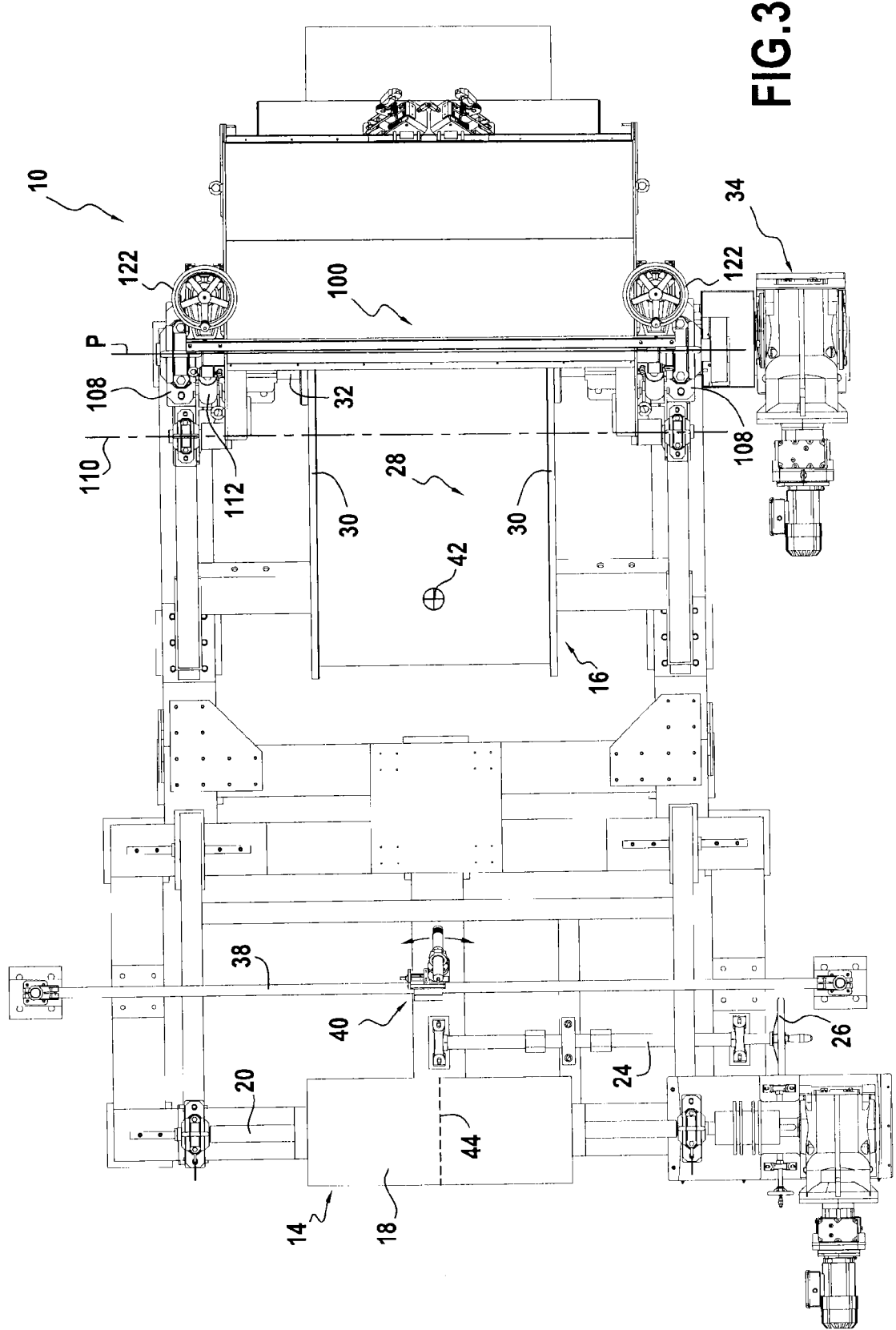

The winding machine shown in FIGS. 1 to 3 serves to perform automated transfer of the fiber texture stored on the takeup mandrel to the impregnation mandrel of the resin injection mold.

The winding machine 10 comprises a support structure 12 supporting in particular a takeup mandrel 14 and an impregnation mandrel 16. These mandrels are removable, i.e. they can be removed from the support structure.

The takeup mandrel 14 receives the fiber structure 18 obtained by three-dimensional weaving. It is carried by a horizontal shaft 20 having one end mounted to rotate relative to the support structure 12 of the winding machine and having its other end connected to the outlet shaft of an electric motor 22, e.g. an alternating current (AC) electric gearmotor.

The assembly constituted by the takeup mandrel 14, its shaft 20, and its electric motor 22 may be moved in translation relative to the support structure along the axis of rotation of the takeup mandrel. This degree of freedom for the takeup mandrel to move in translation makes it possible to align this mandrel with the impregnation mandrel before beginning to wind the fiber texture onto the impregnation mandrel.

The system for moving the takeup mandrel in translation may be formed for example by a wormscrew type rod 24 coupled to the takeup mandrel and having one end fastened to the support structure 12 of the winding machine, and its other end fitted with a handwheel 26. Rotating the rod under drive from the handwheel thus causes the assembly constituted by the takeup mandrel 14, its shaft 20, and its electric motor 22 to move in translation relative to the support structure.

The impregnation mandrel 16 of the winding machine is to receive superposed layers of the fiber texture stored on the takeup mandrel. It presents an outside surface 28 of profile corresponding to the profile of the inside surface of the casing that is to be made, together with two side plates 30.

The impregnation mandrel is carried by a horizontal shaft 32 (FIG. 3) that is parallel to the rotary shaft 20 of the takeup mandrel and that has one end mounted to rotate on the support structure 12 of the winding machine and its other end coupled to the outlet shaft of an electric motor 34, e.g. an AC electric gearmotor.

A control unit 36 is connected to the electric motors 22 and 34 of the two mandrels and enables the speed of rotation of each mandrel to be monitored and controlled. More generally, the control unit serves to govern all of the operating parameters of the winding machine, and in particular the movement in translation of the takeup mandrel when that is motor driven.

The support structure 12 of the winding machine 10 supports a cross-beam 38 having optical sighting means mounted vertically above the mandrels in order to contribute to aligning the takeup mandrel on the impregnation mandrel prior to winding the fiber texture onto the impregnation mandrel.

More precisely, an optical sighting system 40 (e.g. a laser emitting a light beam) is pivotally mounted on the cross-beam above the mandrel. As shown in FIG. 1, this optical sighting system can pivot about the cross-beam 38 on which it is mounted so as to be capable of sighting one or the other of the mandrels of the winding machine. The optical sighting system also possesses a degree of freedom to move laterally that enables it to sight any point over the entire width of the outside surface 28 of the impregnation mandrel (FIG. 3).

The takeup mandrel 14 is aligned on the impregnation mandrel 16 prior to winding the fiber texture as follows.

Initially, a visual marker 42 is positioned on the outside structure 28 of the impregnation mandrel, and the optical sighting system 40 is actuated and moved laterally so as to align its light beam on the visual marker. The optical sighting system is then locked laterally in this position and is pivoted about the cross-beam 38 so as to be vertically over the takeup mandrel. In this position, the optical sighting system sights the fiber texture 18 round on the takeup mandrel 14.

For the takeup mandrel to be properly aligned on the impregnation mandrel, it is necessary to bring a particular warp yarn 44 of the fiber texture (referred to as a "tracer yarn") and of position in the fiber texture that is correlated with the position of the visual marker of the impregnation mandrel into alignment with the light beam emitted by the optical sighting system. For this purpose, the takeup mandrel is moved in translation along its axis of rotation by actuating the handwheel 26 until the tracer yarn 44 is in alignment with the light beam emitted by the optical sighting system.

Once the takeup mandrel is properly aligned on the impregnation mandrel, it is possible to begin winding the fiber texture onto the impregnation mandrel. The free end of the fiber texture of the takeup mandrel is initially fastened on the impregnation mandrel, and then the motors for driving the mandrels in rotation are activated and controlled.

More precisely, the electric motors for driving rotation of the mandrels are controlled by the control unit so as to apply appropriate winding tension on the fiber texture, this tension being monitored by applying a predefined setpoint tension that is converted by the control unit into a predetermined induction current that is applied to that one of the mandrels which offers the opposing torque to the winding (i.e. generally the takeup mandrel). The speed of rotation of the mandrels is likewise controlled by the control unit.

Figure 4:
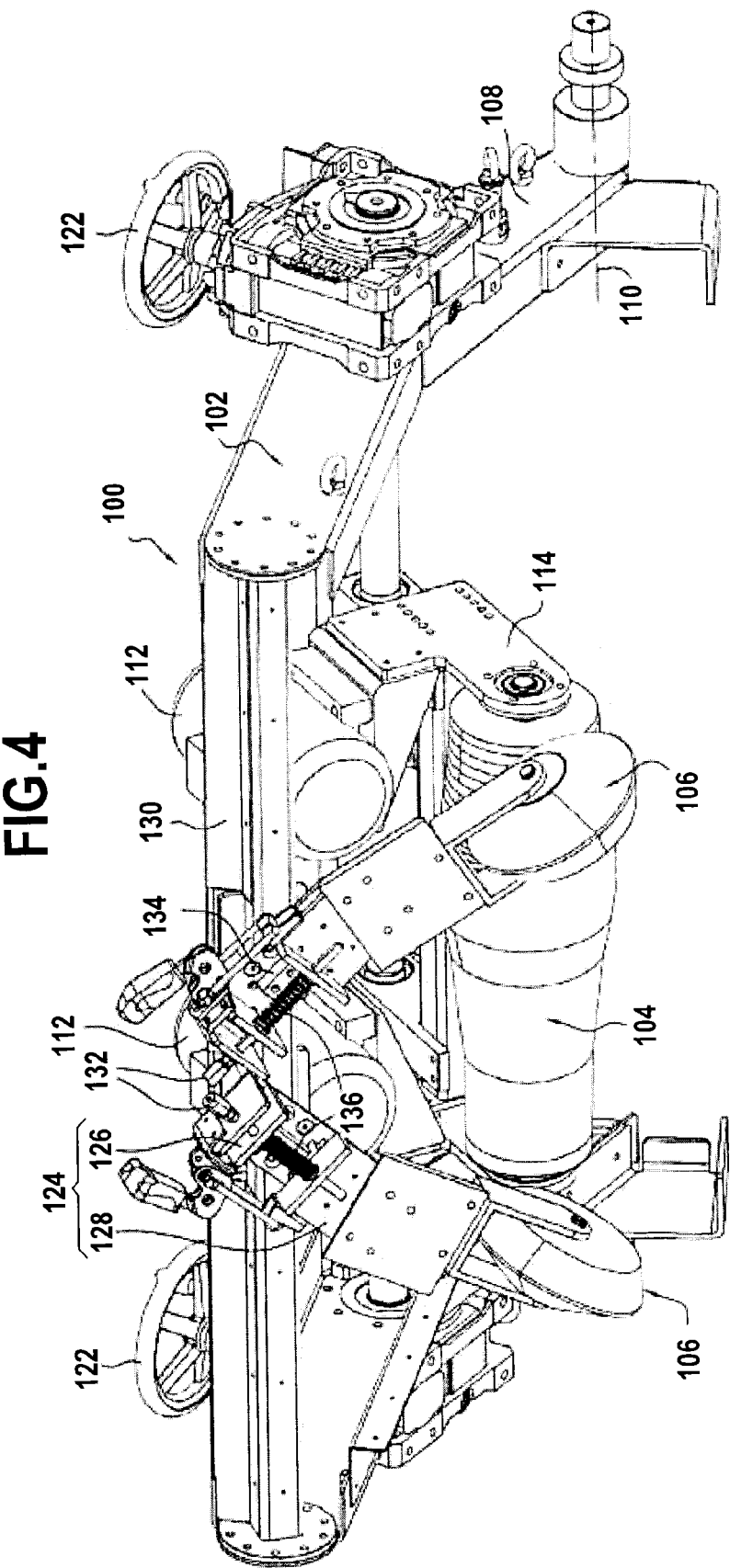

The winding machine 10 also has a compacting device 100 of the invention as shown in FIGS. 4 to 6. This device serves to improve the compacting of the fiber texture layers while they are being wound onto the impregnation mandrel 16.

The compacting device 100 mainly comprises a frame 102 having mounted thereon a compacting roller 104 and two compacting wheels 106.

As shown in FIG. 2, this compacting device is movable between a working position in which the compacting roller bears against the outside surface 28 of the impregnation mandrel and the compacting wheels bear against the corners formed between the outside surface and the side plates of the impregnation mandrel (continuous lines in FIG. 2), and a raised position in which the compacting roller and wheels are separated from the impregnation mandrel (dashed lines in FIG. 2).

The compacting device is fastened on the support structure 12 of the winding machine supporting the takeup and impregnation mandrels. More precisely, the frame 102 of the compacting device has arms 108 that are mounted at one end of the support structure to rotate about a horizontal axis 110. An actuator 1120 having its body fastened to the support structure and its rod fastened to the frame serves to cause the compacting device to pivot about the horizontal axis 110 (see FIG. 2), and thus raise it from its working position.

The compacting device also has means for imparting vibration to the compacting roller and wheels. For example, these means may be constituted by two electric vibrators 112 that are mounted on the frame. These vibrators perform a function that is itself well known, and they generate vibration that propagates from the frame to the compacting roller and wheels, this vibration then being transformed into micropeening on the layers of fiber texture while they are being wound. This micropeening thus serves to amplify the effect of compacting the preform.

Various advantageous arrangements of the compacting roller of the compacting device are described below.

According to one of these advantageous arrangements, provision is made to be able to adjust the position of the compacting roller relative to the frame in order to adjust the position of the roller accurately on the preform wound on the impregnation mandrel.

For this purpose, the compacting roller 104 is mounted to rotate between two plates 114 secured to the frame 102 of the compacting device. More precisely, each plate has an end that is constrained to pivot with a toothed wheel 116 capable of pivoting about a horizontal axis 118 relative to the remainder of the frame. For each plate 114, a wormscrew 120 suitable for being actuated by a handwheel 122 serves to cause the toothed wheel 116, and thus the plate, to pivot about the horizontal axis 118, thereby causing the compacting roller to pivot relative to the frame.

Thus, as shown in FIGS. 7A and 7B, when one of the handwheels 122 is turned, the wormscrew 120 secured thereto causes the associated plate to pivot about the horizontal axis 118. This results in the corresponding end of the compacting roller 104 moving relative to the frame. By manipulating the two handwheels, it is thus possible to adjust the position of the compacting roller relative to the frame.

According to another advantageous arrangement, the outside surface of the compacting roller 104 presents a profile corresponding to a profile of the outside surface 28 of the impregnation mandrel 16 against which it bears when the compacting device is in its working position.

Furthermore, as shown in FIG. 5, the compacting roller 104 preferably has a plurality of longitudinal roll sections 104a, 104b, 104c etc. that are rotatable independently of one another. Generally, the diameter of a retention casing varies between its two ends. Thus, having longitudinal sections of the roller that are free to rotate relative to one another makes it possible to accommodate a difference in speed of rotation between its sections so as to enable the compacting roller to roll on all points of the impregnation mandrel.

Various advantageous arrangements of the compacting wheels of the compacting device are described below.

As for the compacting roller, it is advantageous to make provision to be able to adjust the positions of the compacting wheels relative to the frame.

To this end, each compacting wheel 106 is mounted on a wheel support 124 having a first portion 126 forming a clamp and a second portion 128 forming a slider.

Figure 8A:
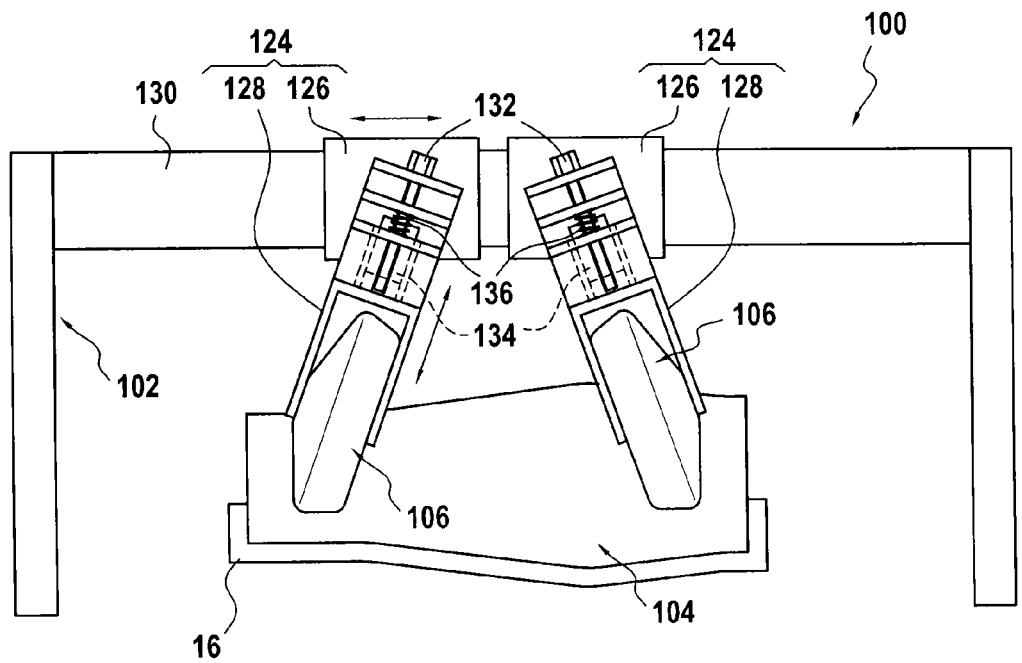
FIGS. 8A and 8B are views of the device of FIGS. 4 to 6 showing the adjustment of the position of the compacting wheels.
Figure 8B:
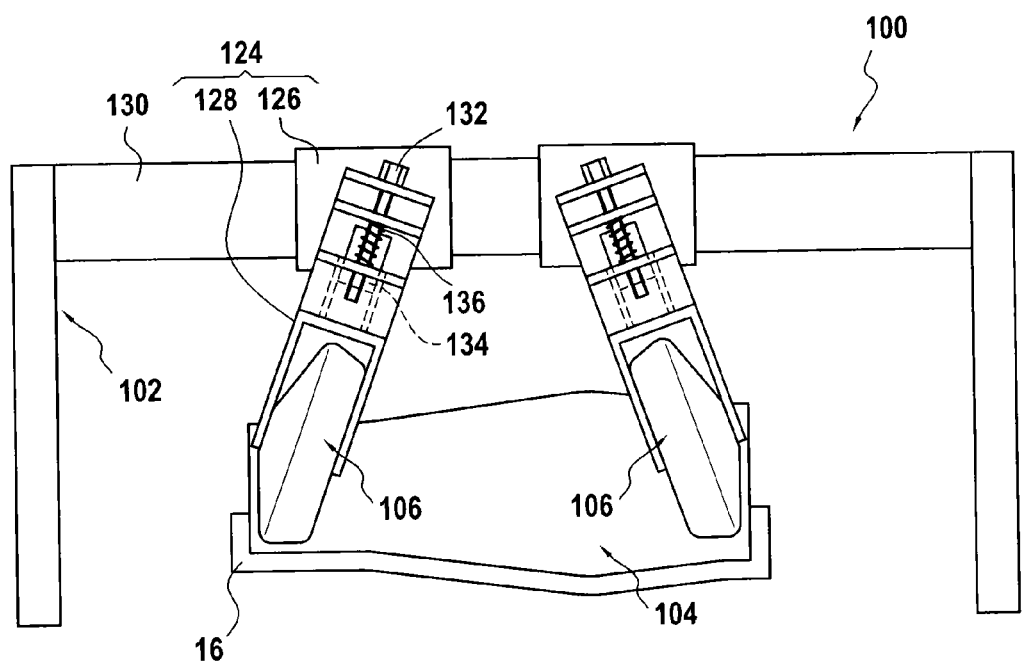

As shown in FIGS. 8A and 8B, the first portion 126 of the wheel supports is suitable for sliding on a longitudinal rod 130 fastened to the frame 102 in such a manner as to enable the positions of the compacting wheels to be adjusted relative to the frame in a longitudinal direction. A locking system (not shown) enables the clamps to be held in position.

The second portion 128 of the wheel support is fastened to the first portion and it is suitable for sliding relative thereto in a radial direction so as to enable the positions of the compacting wheels to be adjusted relative to the frame in the radial direction.

For this purpose, the fastening between the two portions of each wheel support is provided by means of a connection of the type comprising a wormscrew and a nut: on being turned one way or the other, a wormscrew 132 secured to the first portion serves to cause the second portion to slide along a guide rail 134 of the first portion, which rail extends in a radial direction. In other words, turning the wormscrew one way or the other causes the second portion of the wheel support to move radially relative to the first portion that remains stationary. A spring 136 mounted around the wormscrew 132 and between the plates of the two portions of the wheel support serves firstly to adjust the compacting force applied by the wheels against the preform, and secondly to absorb irregularities in the shape of the preform.

Other advantageous arrangements of the compacting device are described below.

In particular, the compacting roller 104 and the compacting wheels 106 may be covered in a coating made of an elastomer material. Such a coating serves to enable the profiles of the compacting roller and wheels to adapt accurately to the profile of the preform wound on the impregnation mandrel, so as to ensure that a uniform pressure is applied at all points on its outside surface.

Furthermore, as shown in FIG. 2, the compacting device 100, when in the working position on the impregnation mandrel 16, is arranged angularly in such a manner that the axis of the compacting roller 104 is set at a corner α of about 20° relative to a vertical plane P containing the center of rotation of the mandrel, the axes of the compacting wheels 106 then being spaced from said plane P by a corner β lying in the range 30° to 45°.

It should be observed that in this working position of FIG. 2, the compacting wheels 106 are situated behind the compacting roller 104 relative to the forward direction of the fiber texture on the impregnation mandrel. Naturally it is possible to envisage an inverse arrangement.

The invention claimed is:

1. A compacting device for a machine for winding a fiber texture on an impregnation mandrel, the device comprising:
    a frame including mounted thereon a compacting roller for bearing against an outside surface of an impregnation mandrel of a winding machine;
    two compacting wheels, each configured to bear against a corner formed between the outside surface and a side plate of the impregnation mandrel;
    means for applying vibration to the compacting roller and wheels; and
    means for adjusting posit s of compacting wheels relative to the frame, each compacting wheel being mounted on a wheel support having a first portion forming a clamp suitable for sliding on a stationary longitudinal rod of the frame so as to enable the compacting wheels to be adjusted in position relative to the frame in a longitudinal direction, and a second portion forming a slider mounted on the first portion and suitable for sliding relative thereto in a radial direction so as to enable the positions of the compacting wheels to be adjusted relative to the frame in said radial direction.

2. A device according to claim 1, wherein the means for applying vibration to the compacting roller and wheels comprises at least one electric vibrator mounted on the frame.

3. A device according to claim 1, further comprising means for adjusting a position of the compacting roller relative to the frame.

4. A device according to claim 3, wherein the compacting roller is mounted to rotate between two plates secured to the frame, each plate having one end constrained to pivot with a toothed wheel configured to pivot about a horizontal axis by meshing with a wormscrew to enable the position of the compacting roller to be adjusted relative to the frame.

5. A device according to claim 1, wherein the outside surface of the compacting roller presents a profile corresponding to a profile of an outside surface of the impregnation mandrel against which it is to bear.

6. A device according to claim 1, wherein the compacting roller comprises a plurality of longitudinal roller sections that are mutually independent in rotation.

7. A device according to claim 1, wherein the compacting roller and the compacting wheels are covered in a coating made of an elastomer material.

8. A device according to claim 1, wherein the first and second portions of the wheel support are fastened to each other by a wormscrew and a nut, the wormscrew is secured to the first portion such that turning the wormscrew causes the second portion to slide along a guide rail of the first portion extending in the radial direction such that the second portion moves radially relative to the first portion that is stationary.

9. A device according to claim 8, wherein a spring is mounted around the wormscrew and between plates of the first and second portions.

10. A machine for winding a fiber texture on an impregnation mandrel, the machine comprising:
    a takeup mandrel on which a fiber texture obtained by three-dimensional weaving is to be stored, the takeup mandrel having an axis of rotation that is substantially horizontal;
    an impregnation mandrel onto which superposed layers of the fiber texture stored on the takeup mandrel are to be wound, the impregnation mandrel having an axis of rotation that is substantially horizontal and parallel to the axis of rotation of the takeup mandrel;
    electric motors for driving the mandrels in rotation about respective axes of rotation thereof;
    and
    a compacting device according to claim 1.

11. A machine according to claim 10, further comprising a support structure including the compacting device mounted thereon to pivot about a substantially horizontal axis, together with at least one actuator having its body fastened to the support structure and its rod fastened to a frame of the device to enable the compacting device to be pivoted about the horizontal axis.

\* \* \* \* \*